US011244817B2

(12) United States Patent
Oshiro

(10) Patent No.: US 11,244,817 B2
(45) Date of Patent: Feb. 8, 2022

(54) ANALYTICAL DEVICE, ANALYSIS METHOD AND PROGRAM

(71) Applicant: SHIMADZU CORPORATION, Kyoto (JP)

(72) Inventor: Tomoyuki Oshiro, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/058,800

(22) PCT Filed: May 31, 2018

(86) PCT No.: PCT/JP2018/021022
§ 371 (c)(1),
(2) Date: Nov. 25, 2020

(87) PCT Pub. No.: WO2019/229950
PCT Pub. Date: Dec. 5, 2019

(65) Prior Publication Data
US 2021/0210316 A1 Jul. 8, 2021

(51) Int. Cl.
H01J 49/00 (2006.01)
H01J 49/02 (2006.01)
(Continued)

(52) U.S. Cl.
CPC ...... *H01J 49/0027* (2013.01); *H01J 49/0009* (2013.01); *H01J 49/0036* (2013.01);
(Continued)

(58) Field of Classification Search
CPC .... H01J 49/0027; H01J 49/022; H01J 49/405; H01J 49/0009; H01J 49/40; H01J 49/0036; H01J 49/429; H01J 49/401; G01N 27/62
(Continued)

(56) References Cited

U.S. PATENT DOCUMENTS

2019/0080895 A1* 3/2019 Jiang .................. H01J 49/4225
2019/0088460 A1 3/2019 Oshiro
2021/0210330 A1* 7/2021 Verenchikov ......... H01J 49/025

FOREIGN PATENT DOCUMENTS

JP 2012-104424 A 5/2012
WO 2017/158842 A1 9/2017

OTHER PUBLICATIONS

International Search Report for PCT/JP2018/021022 dated Aug. 7, 2018 [PCT/ISA/210].
(Continued)

*Primary Examiner* — Kiet T Nguyen
(74) *Attorney, Agent, or Firm* — Sughrue Mion, PLLC

(57) ABSTRACT

An analytical device includes: a mass spectrometry unit that separates ions based on flight time and detects the ions having been separated; an analysis unit that creates data corresponding to a spectrum in which an intensity of the ions having been detected and the flight time or m/z corresponding to the flight time are associated; a peak width calculation unit that calculates a first peak width at a first intensity and a second peak width at a second intensity different from the first intensity for at least one peak in the spectrum; and an adjustment unit that performs an adjustment of the mass spectrometry unit based on the first peak width and the second peak width.

14 Claims, 12 Drawing Sheets

(51) Int. Cl.
*H01J 49/40* (2006.01)
*H01J 49/42* (2006.01)

(52) U.S. Cl.
CPC ............ *H01J 49/022* (2013.01); *H01J 49/40* (2013.01); *H01J 49/401* (2013.01); *H01J 49/405* (2013.01); *H01J 49/429* (2013.01)

(58) Field of Classification Search
USPC ....................................................... 250/287
See application file for complete search history.

(56) References Cited

OTHER PUBLICATIONS

Written Opinion for PCT/JP2018/021022 dated Aug. 7, 2018 [PCT/ISA/237].

* cited by examiner

ANALYTICAL DEVICE, ANALYSIS METHOD AND PROGRAM

CROSS REFERENCE TO RELATED APPLICATIONS

This application is a National Stage of International Application No. PCT/JP2018/021022 filed May 31, 2018.

TECHNICAL FIELD

The present invention relates to an analytical device, an analysis method, and a program.

BACKGROUND ART

In a time-of-flight mass spectrometer (hereinafter, appropriately referred to as TOF-MS), ions are accelerated by an electric field generated by a pulse voltage and a constant voltage, and m/z (mass-to-charge ratio) of each ion is measured based on flight time that elapses before accelerated ions are detected by an ion detector. Based on the measurement accuracy of TOF-MS, ions of the same m/z are incident on an ion detector with a certain time variation, and a pulsed detection signal having a distribution corresponding to this variation is output from the ion detector. From this detection signal, a mass spectrum showing the detection intensity corresponding to m/z can be obtained.

In precise mass spectrometry, it may be required to suppress the variation in flight time depending on measurement conditions to about several ppm or less. In order to perform mass spectrometry more precisely, it is necessary to adjust each part of the TOF-MS so as to suppress the above-mentioned variation. For example, Patent Literature 1 (PTL 1) describes adjusting a voltage applied to a quadrupole electrode so that a half width of a peak of the mass spectrum is minimized.

CITATION LIST

Patent Literature

PTL 1: Japanese Laid-Open Patent Publication No. 2012-104424

SUMMARY OF INVENTION

Technical Problem

However, if the TOF-MS is adjusted based on the half width of the peak of the mass spectrum, there is a problem that it cannot sufficiently reduce distortion of peak waveform such as leading and tailing.

Solution to Problem

According to the 1st aspect of the present invention, an analytical device comprises: a mass spectrometry unit that separates ions based on flight time and detects the ions having been separated; an analysis unit that creates data corresponding to a spectrum in which an intensity of the ions having been detected and the flight time or m/z corresponding to the flight time are associated; a peak width calculation unit that calculates a first peak width at a first intensity and a second peak width at a second intensity different from the first intensity for at least one peak in the spectrum; and an adjustment unit that performs an adjustment of the mass spectrometry unit based on the first peak width and the second peak width.

According to the 2nd aspect of the present invention, in the analytical device according to the 1st aspect, it is preferred that the peak width calculation unit calculates the first peak width with a predetermined intensity smaller than 50% of a peak intensity as the first intensity.

According to the 3rd aspect of the present invention, in the analytical device according to the 2nd aspect, it is preferred that the peak width calculation unit calculates the first peak width with a predetermined intensity of 15% or more and 40% or less of the peak intensity as the first intensity.

According to the 4th aspect of the present invention, in the analytical device according to the 2nd or 3rd aspect, it is preferred that the peak width calculation unit calculates the second peak width with an intensity corresponding to 50% of the peak intensity as the second intensity.

According to the 5th aspect of the present invention, in the analytical device according to any one of the 1st to 4th aspects, it is preferred that the adjustment unit performs the adjustment based on a ratio obtained by dividing either one of the first peak width and the second peak width by the other.

According to the 6th aspect of the present invention, in the analytical device according to any one of the 1st to 5th aspects, it is preferred that the mass spectrometry unit includes: a first acceleration electrode to which a pulse voltage for accelerating the ions is applied; a flight tube that defines a space in which the ions fly; and a second acceleration electrode arranged between the first acceleration electrode and the flight tube.

According to the 7th aspect of the present invention, in the analytical device according to the 6th aspect, it is preferred that the adjustment unit adjusts at least one voltage of among selected from the first acceleration electrode, the flight tube, and the second acceleration electrode.

According to the 8th aspect of the present invention, in the analytical device according to the 6th aspect, it is preferred that the mass spectrometry unit comprises a reflectron electrode to which a voltage is applied to change traveling directions of the ions accelerated; and the adjustment unit adjusts at least one voltage selected from voltages of the first acceleration electrode, the flight tube, the second acceleration electrode and the reflectron electrode.

According to the 9th aspect of the present invention, in the analytical device according to the 6th aspect, it is preferred that the mass spectrometry unit comprises a collision cell that dissociates the ions internally: the adjustment unit adjusts at least one of, a voltage of the collision cell and a voltage of the first acceleration electrode when the pulse voltage is not applied thereto.

According to the 10th aspect of the present invention, in the analytical device according to any one of the 1st to 9th aspects, it is preferred that the adjustment unit sequentially adjusts voltages of a plurality of electrodes in the mass spectrometry unit so that a sensitivity is maximized.

According to the 11th aspect of the present invention, in the analytical device according to the 10th aspect, it is preferred that the adjustment unit, based on the first peak width and the second peak width, determines whether or not to continue the adjustment and whether or not to fix a voltage of any of the plurality of electrodes.

According to the 12th aspect of the present invention, it is preferred that the analytical device according to any one of the 1st to 11th aspects further comprises a storage unit that stores a voltage of an electrode at the time that the adjustment is completed.

According to the 13th aspect of the present invention, an analysis method comprises: separating ions based on flight time and detecting the ions having been separated with an analytical device; creating data corresponding to a spectrum in which an intensity of the ions having been detected and the flight time or m/z corresponding to the flight time are associated; calculating a first peak width at a first intensity and a second peak width at a second intensity different from the first intensity for at least one peak in the spectrum; and performing an adjustment of the analytical device based on the first peak width and the second peak width.

According to the 14th aspect of the present invention, a program is for causing a processing device to perform: a data creation processing to create data corresponding to a spectrum in which an intensity of ions having been detected and flight time or m/z corresponding to the flight time are associated based on a detection signal obtained by detecting the ions separated based on the flight time; a peak width calculation processing to calculate a first peak width at a first intensity and a second peak width at a second intensity different from the first intensity for at least one peak in the spectrum; and an adjustment processing to adjust an analytical device based on the first peak width and the second peak width.

Advantageous Effects of Invention

According to the present invention, it is possible to improve the distortion of the peak waveform, such as leading and tailing, in the mass spectrum, and to perform mass spectrometry more precisely.

DESCRIPTION OF EMBODIMENTS

Hereinafter, embodiments for carrying out the present invention will be described with reference to the drawings.

First Embodiment

Figure 1:
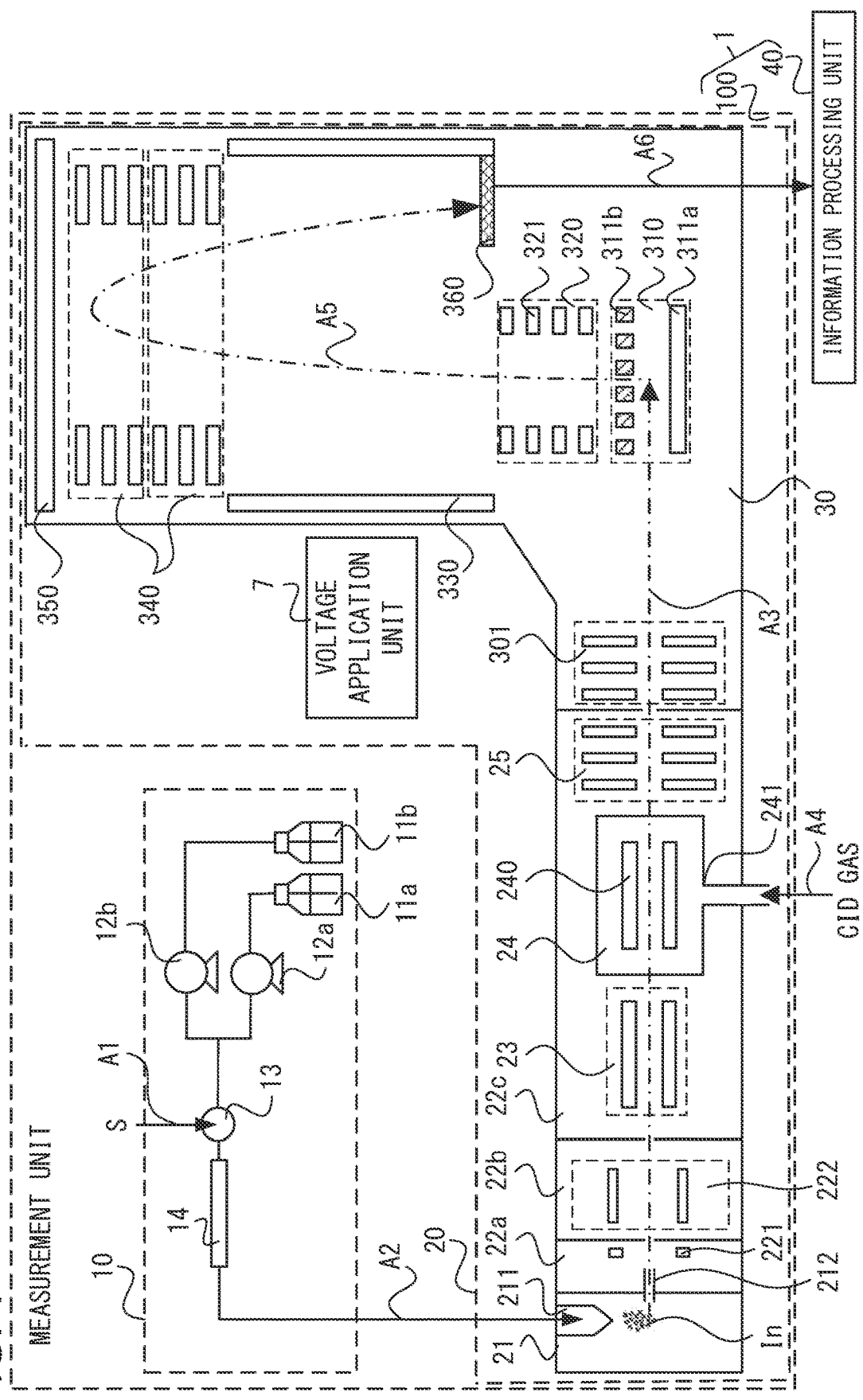
FIG. 1 is a conceptual diagram showing a configuration of an analytical device according to one embodiment.

FIG. 1 is a conceptual diagram for explaining an analytical device according to the present embodiment. The analytical device 1 includes a measurement unit 100 and an information processing unit 40. The measurement unit 100 includes a liquid chromatograph 10 and a mass spectrometer 20.

The liquid chromatograph 10 includes mobile phase containers 11a and 11b, liquid feeding pumps 12a and 12b, a sample introduction unit 13, and an analytical column 14. The mass spectrometer 20 includes an ionization chamber 21 having an ionization unit 211, a first vacuum chamber 22a having an ion lens 221, a tube 212 for introducing ions In from the ionization chamber 21 into the first vacuum chamber 22a, a second vacuum chamber 22b having an ion guide 222, a third vacuum chamber 22c, an analysis chamber 30, and a voltage application unit 7. The third vacuum chamber 22c includes a first mass separation unit 23, a collision cell 24, and an ion guide 25. The collision cell 24 includes an ion guide 240 and a CID gas introduction port 241.

The analysis chamber 30 includes an ion transport electrode 301, a first acceleration unit 310, a second acceleration unit 320, a flight tube 330, a reflectron electrode 340, a back plate 350, and a detection unit 360. The first acceleration unit 310 includes a pusher electrode 311a and a puller electrode 311b. Hereinafter, the electrodes (the pusher electrode 311a and the puller electrode 311b) included in the first acceleration unit 310 are referred to as the first acceleration electrodes 311, and the electrodes included in the second acceleration unit 320 are referred to as the second acceleration electrodes 321.

It is to be noted that, as long as time-of-flight mass spectrometry can be performed, the configuration of each part of the analytical device 1 is not particularly limited.

The type of the liquid chromatograph (LC) 10 is not particularly limited. Each of the mobile phase containers 11a and 11b includes a container capable of storing liquid such as vial, bottle or the like, and store a mobile phase having a composition different from each other. The mobile phases stored in the mobile phase containers 11a and 11b are referred to as mobile phase A and mobile phase B, respectively. The mobile phase A and the mobile phase B having been output from the liquid feed pumps 12a and 12b, respectively, are mixed on the way of the flow path and introduced into the sample introduction unit 13. The composition of the mobile phase introduced into the analytical column 14 changes with time as the liquid feed pumps 12a and 12b change the flow rates of the mobile phase A and the mobile phase B, respectively.

The sample introduction unit 13 includes a sample introduction device such as an autosampler, and introduces a sample S into the mobile phase (arrow A1). The sample S introduced by the sample introduction unit 13 passes through a guard column (not shown) as appropriate and is introduced into the analytical column 14.

The analytical column 14 has a stationary phase, and each component of the introduced sample S is eluted at a retention time different from each other according to difference in affinity of the component with the mobile phase and the stationary phase. The types of the analytical column 14 and the stationary phase are not particularly limited. The eluted sample eluted from the analytical column 14 is introduced into the ionization chamber 21 of the mass spectrometer 20 (arrow A2). It is preferable that the eluted sample in the analytical column 14 be input to the mass spectrometer 20 by online control without requiring an operation such as dispensing by a user of the analytical device 1 (hereinafter, simply referred to as "user").

The mass spectrometer 20 is an orthogonal acceleration type TOF-MS that performs tandem mass spectrometry on the eluted sample introduced from the analytical column 14. The path of ions In containing an ionized eluted sample is schematically shown by the arrow A3 of long dashed short dashed line.

The ionization chamber 21 of the mass spectrometer 20 ionizes the introduced eluted sample. The ionization method is not particularly limited, however in a case liquid chromatography/tandem mass spectrometry (LC/MS/MS) is performed as in the present embodiment, an electrospray method (ESI) is preferable, and in the following embodiments, a case where the ESI is used is described. The ions In including the ionized eluted sample emitted from the ionization unit 211 moves due to, for example, pressure difference between the ionization chamber 21 and the first vacuum chamber 22a, passes through the tube 212, and enters the first vacuum chamber 22a.

A degree of vacuum is the highest in the analysis chamber 30, followed by that of the third vacuum chamber 22c, the second vacuum chamber 22b and the first vacuum chamber 22a in this order, and the analysis chamber 30 is evacuated to a pressure of, for example, $10^{-3}$ Pa or less. The ions In that have entered the first vacuum chamber 22a pass through the ion lens 221 and are introduced into the second vacuum chamber 22b. The ions In that have entered the second vacuum chamber 22b pass through the ion guide 222 and are introduced into the third vacuum chamber 22c. The ions In introduced into the third vacuum chamber 22c are emitted to the first mass separation unit 23. By the time the ions In enter the first mass separation unit 23, ions In are converged by electromagnetic action of the ion lens 221, ion guide 222, and the like.

The first mass separation unit 23 includes a quadrupole mass filter, and has selectively pass through ions In of set m/z as precursor ions by electromagnetic action based on a voltage applied to the quadrupole mass filter and emits toward the collision cell 24.

The collision cell 24 dissociates the ionized eluted sample by collision induced dissociation (CID) while controlling movement of ions In by the ion guide 240 to generate fragment ions. A gas containing argon, nitrogen, or the like (hereinafter referred to as CID gas) that ions collide with during CID is introduced from the CID gas introduction port 241 so as to have a predetermined pressure in the collision cell (arrow A4). The ions In containing generated fragment ion are emitted toward the ion guide 25. The ions In that have passed through the ion guide 25 enter the analysis chamber 30.

The ions In that have entered the analysis chamber 30 pass through the ion transport electrode 301 while being controlled in movement by the ion transport electrode 301, and enter the first acceleration unit 310. The pusher electrode 311a of the first acceleration unit 310 is the acceleration electrode, to which a pulse voltage having the same polarity as the polarity of ions to be detected is applied, to accelerate the ions In in a direction away from the pusher electrode 311a. The puller electrode 311b of the first acceleration unit 310 is formed in a grid pattern so that ions In can pass through the inside thereof. The puller electrode 311b is the acceleration electrode, to which a pulse voltage having a polarity opposite to the polarity of ions to be detected is applied, to accelerate the ions In located between the pusher electrode 311a and the puller electrode 311b towards the puller electrode 311b. The absolute value of the wave height of the pulse voltage applied to the pusher electrode 311a and the puller electrode 311b is several thousand V or the like. During a time when the pulse voltage is not applied to the pusher electrode 311a and the puller electrode 311b, a voltage having a magnitude of several tens of volts or the like is appropriately applied. The ions In accelerated by an electric field generated by the pulse voltage applied to the pusher electrode 311a and the puller electrode 311b in the first acceleration unit 310 enter the second acceleration unit 320. In FIG. 1, the path of the ions In accelerated by the first acceleration unit 310 is schematically shown by an arrow A5.

To the second acceleration electrode 321 of the second acceleration unit 320, a voltage of, for example, several thousand V having a polarity opposite to the polarity of ions to be detected is applied. The ions In passing through the second acceleration unit 320 are accelerated by an electric field generated by the voltage applied to the second acceleration electrode 321 and enter the space surrounded by the flight tube 330.

The flight tube 330 controls movement of the ions In by the voltage applied to the flight tube 330, and defines the space in which the ions In fly. A voltage of, for example, several thousand V having a polarity opposite to the polarity of the ions to be detected is applied to the flight tube 330.

A voltage higher than the flight tube voltage is applied to the reflectron electrode 340 and the back plate 350 at the time of detecting positive ions, and the electric field generated by this voltage changes the traveling direction of ions In. The ions In whose traveling direction has been changed move along the folded orbit schematically shown by the arrow A5 and enter the detection unit 360. It is to be noted that, at the time of detecting negative ions, a voltage lower than the voltage applied to the flight tube is applied to the reflectron electrode 340 and the back plate 350.

The detection unit 360 includes an ion detector such as a micro-channel plate and detects the ions In that have entered the detection unit 360. A detection mode may be either a positive ion mode for detecting positive ions or a negative ion mode for detecting negative ions. A detection signal obtained by detecting the ions is A/D converted, becomes a digital signal, and is input to the information processing unit 40 (arrow A6).

The voltage application unit 7 includes a voltage source capable of applying a pulse voltage or a DC voltage. The voltage application unit 7 applies a voltage to each of the first acceleration electrode 311, the second acceleration electrode 321, the flight tube 330, the reflectron electrode 340, the back plate 350, the detection unit 360, and the like.

Figure 2:
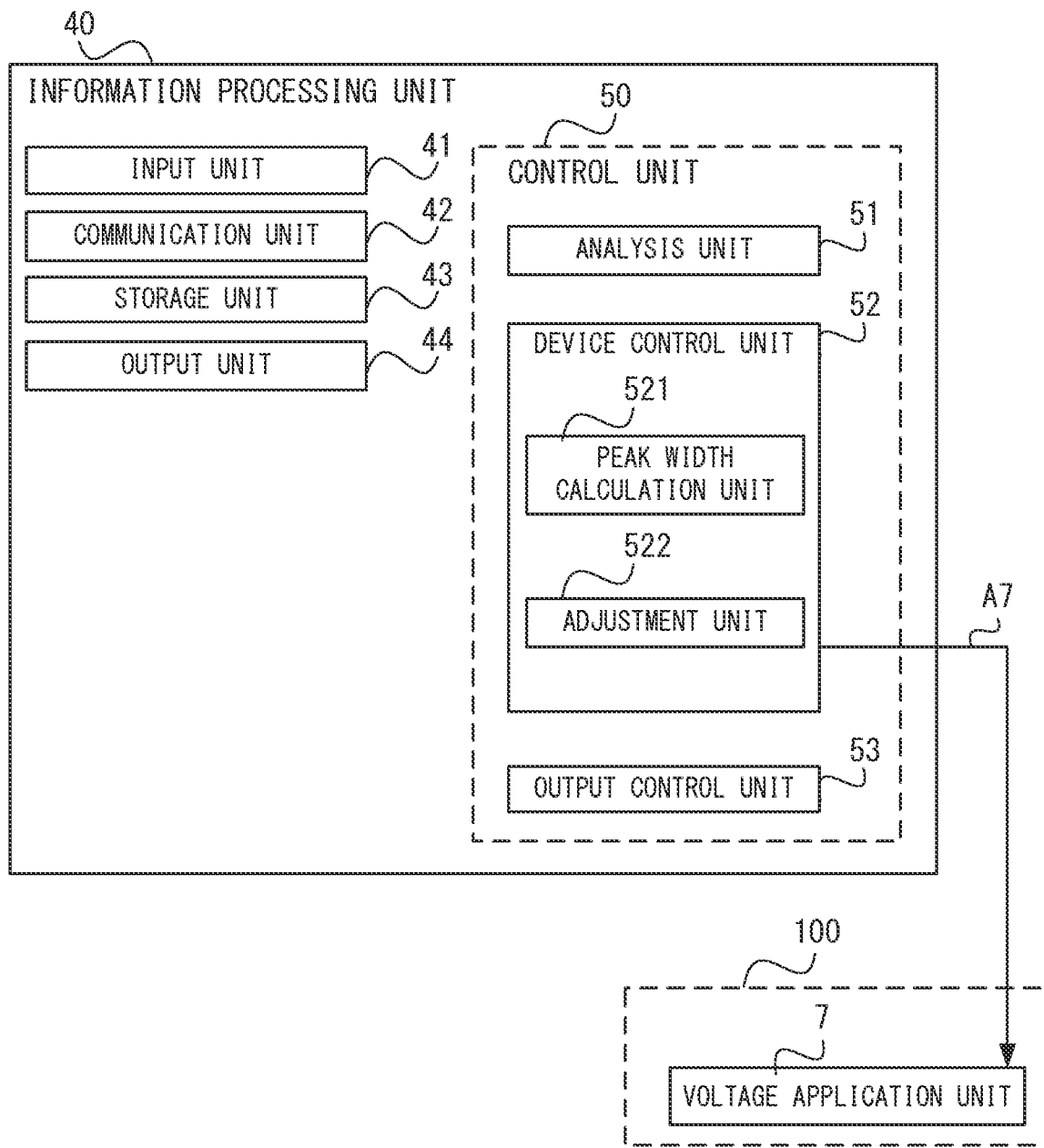
FIG. 2 is a conceptual diagram showing a configuration of an information processing unit.

FIG. 2 is a conceptual diagram showing a configuration of the information processing unit 40 of the analytical device 1. The information processing unit 40 includes an input unit 41, a communication unit 42, a storage unit 43, an output unit 44, and a control unit 50. The control unit 50 includes an analysis unit 51, a device control unit 52, and an output control unit 53. The device control unit 52 includes a peak width calculation unit 521 and an adjustment unit 522.

The information processing unit 40 is provided with an information processing device such as a computer and serves as an interface with a user as appropriate, and also performs processing such as communication, storage, and calculation related to various data. The information processing unit 40 is a processing device that performs control of the measurement unit 100 and processing such as analysis, display and the like.

It is to be noted that, the information processing unit 40 may be configured as one device integrated with the liquid chromatograph 10 and/or the mass spectrometer 20. Further, a part of data used by the analytical device 1 may be stored in a remote server or the like, and a part of arithmetic processing performed by the analytical device 1 may be performed by a remote server or the like. The information processing unit 40 may control an operation of each unit of the measurement unit 100, or a device constituting each unit may control the operation of each unit.

The input unit 41 of the information processing unit 40 includes an input device such as a mouse, a keyboard, various buttons, and/or a touch panel. The input unit 41 receives from the user information necessary for the measurement performed by the measurement unit 100 and the processing performed by the control unit 50.

The communication unit 42 of the information processing unit 40 includes a communication device capable of communicating by a wireless or wired connection via a network such as the internet. The communication unit 42 appropriately transmits and receives necessary data. For example, the communication unit 42 receives data necessary for measurement by the measurement unit 100 and transmits data processed by the control unit 50 such as the analysis result of the analysis unit 51.

The storage unit 43 of the information processing unit 40 includes a non-volatile storage medium. The storage unit 43 stores, measurement data based on the detection signal output from the detection unit 360, a voltage value set when the voltage of each part of the mass spectrometer 20 was adjusted in the past by the adjustment part 522 described later, and a program for the control unit 50 to execute processing, and the like.

The output unit 44 of the information processing unit 40 includes a display device such as a liquid crystal monitor, and/or a printer. The output unit 44 is controlled by the output control unit 53 and outputs information on the measurement of the measurement unit 100, analysis results of the analysis unit 51, and the like by displaying on the display device or printing on a print medium.

The control unit 50 of the information processing unit 40 includes a processor such as a CPU. The control unit 50 performs various processings by executing a program stored in the storage unit 43 or the like, such as controlling the measurement unit 100 or analyzing measurement data.

The analysis unit 51 analyzes the measurement data. The analysis unit 51 converts flight time of the detection signal output from the detection unit 360 into m/z based on a calibration data acquired in advance, and makes the m/z values of the detected ions In correspond to the detection intensity. For adjusting each part of the mass spectrometer 20, the analysis unit 51 creates data corresponding to a mass spectrum of a standard sample based on a detection signal output from the detection unit 360 in a case where the standard sample having a known m/z is introduced into the mass spectrometer 20. The standard sample is introduced into the mass spectrometer 20 by introducing a solution containing the standard sample into the ionization unit 211 using a liquid feeding pump (not shown) or by introducing the solution from the sample introduction unit 13.

The analysis unit 51, in analysis of the sample S to be analyzed, creates data corresponding to a mass chromatogram in which retention time corresponds to the detection intensity, creates data corresponding to the mass spectrum in which m/z corresponds to the detection intensity, and identifies and quantifies detected molecules. The analysis method of analyzing the sample S performed by the analysis unit 51 is not particularly limited.

The device control unit 52 of the control unit 50 controls the measurement operation of the measurement unit 100 based on the measurement conditions and the like set according to the input and the like via the input unit 41. For example, the device control unit 51 controls the voltage applied to the first accelerating electrode 311, the second accelerating electrode 321 and the flight tube 330. For example, the device control unit 51 inverts the voltages applied to the second accelerating electrode 321, the flight tube 330, the reflectron electrode 340 and the like according to the polarity of the ions to be detected.

The peak width calculation unit 521 calculates peak widths corresponding to a plurality of intensities for at least one peak in the mass spectrum that is obtained by measuring the standard sample and is created by the analysis unit 51. Which peak is selected in the mass spectrum is not particularly limited. It may be selected based on m/z or the like of the molecule to be analyzed, or a plurality of peaks may be selected and an average of the peak widths may be set as a first peak width w1 or a second peak width w2 described later.

It is to be noted that, in the case where a sample contains a molecule whose m/z is known, the peak width calculation unit 521 may calculate the peak width in the mass spectrum of a sample other than a standard sample.

Figure 3A:
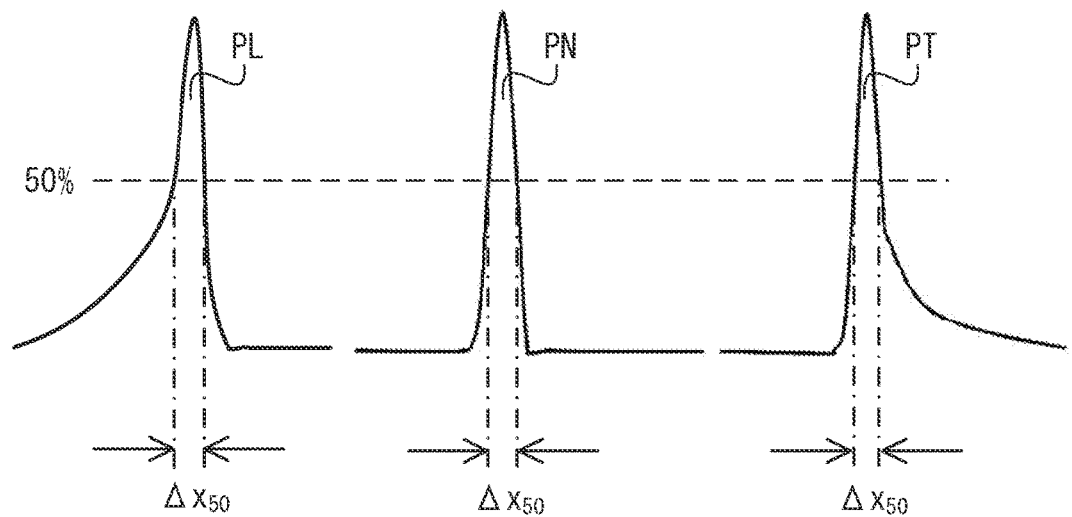
FIG. 3(A) is a conceptual diagram showing a conventional method of calculating a peak width.

FIG. 3(A) is a conceptual diagram showing a conventional method of calculating a peak width in an adjustment method of a mass spectrometer. In the conventional adjustment method, whether or not a desired peak is obtained was evaluated by using a peak width at 50% of a peak intensity of a peak of a mass spectrum obtained by detecting a standard sample (that is, full width at half maximum or half width at half maximum). In the following, a peak intensity is the maximum intensity at a peak. The peak intensity is calculated by appropriately performing calculation processing for improving accuracy such as smoothing and background removal.

However, with the conventional adjustment method, a peak with leading (hereinafter referred to as leading peak PL) and a peak with tailing (hereinafter referred to as tailing peak PT) could not be appropriately evaluated. In the following, the leading peak PL means a peak in which an area in the peak corresponding to m/z values smaller than the m/z value corresponding to the peak intensity of the peak is wider by a predetermined ratio such as 10% or more or 30% or more than an area in the peak corresponding to m/z values larger than the m/z value corresponding to the peak intensity of the peak. Moreover, tailing peak PT means a peak in which an area in the peak corresponding to m/z values larger than the m/z value corresponding to the peak intensity of the peak is wider by a predetermined ratio such as 10% or more or 30% or more than an area in the peak corresponding to m/z values smaller than the m/z value corresponding to the peak intensity of the peak. The peak that is neither the leading peak PL nor the tailing peak PT is called an unbiased peak PN.

In FIG. 3(A), the full widths at half maximum $\Delta x_{50}$ of the leading peak PL and the tailing peak PT are substantially the same as the full width at half maximum $\Delta x_{50}$ of the unbiased peak PN. In this case where the peak is evaluated by the half width, it is often impossible to determine that the peak is the leading peak PL or the tailing peak PT. Therefore, in the case where the mass spectrometer is adjusted by evaluating the peak by the full width at half maximum, the leading peak PL and the tailing peak PT may also appear in a mass spectrum obtained by actually detecting the sample S to be analyzed. As a result, in the conventional adjustment method, for a molecule having a certain m/z, the position of m/z at which the peak intensity is taken is biased with respect to the detected variation in m/z, so that m/z could not be accurately measured. Further, since the shape of the peak deviates from the normal distribution, there was a problem that reliability of calculated statistical values is low.

Figure 3B:
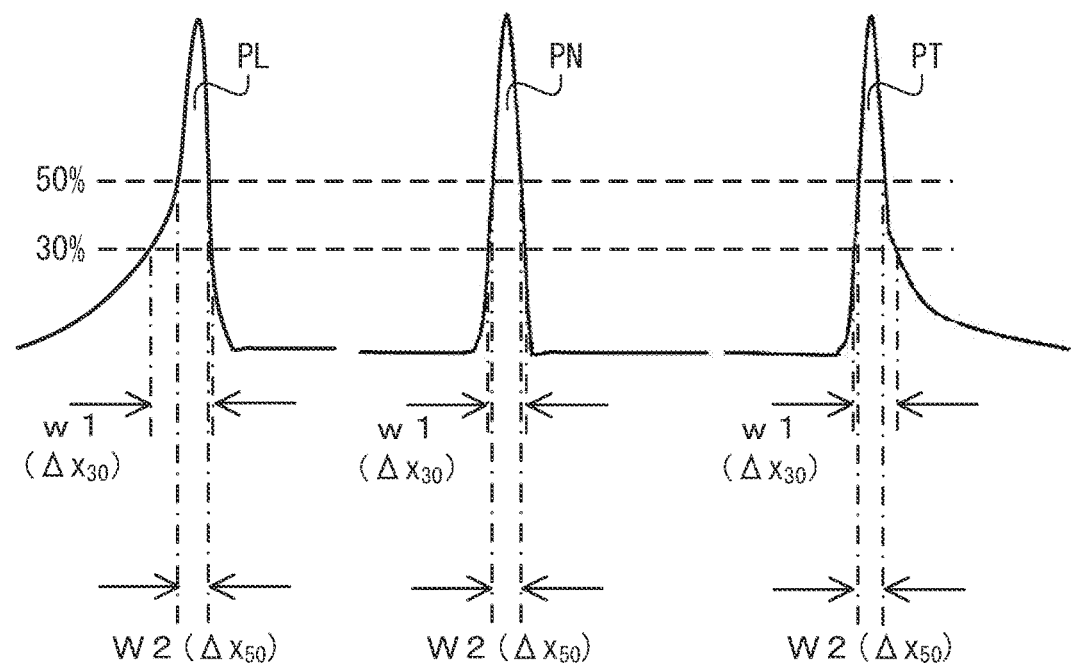
FIG. 3(B) is a conceptual diagram showing a method of calculating a peak width according to the embodiment.

FIG. 3(B) is a conceptual diagram showing a method of calculating a peak width according to the present embodiment. The peak width calculation unit 521 calculates the first peak width w1 at the first intensity and calculates the second peak width w2 at the second intensity different from the first intensity. In the example of FIG. 3(B), the first peak width w1 corresponding to the intensity of 30% of the peak intensity as the first intensity and the second peak width w2 corresponding to the intensity of 50% of the peak intensity as the second intensity, are calculated.

It is to be noted that, the first peak width w1 and the second peak width w2 are not particularly limited as long as they are lengths representing the spread of peak at the corresponding intensities. For example, as the second peak width w2, the full width at half maximum may be used or the half width at half maximum may be used.

The first intensity, which is 30% of the peak intensity, corresponds to the peak width of a portion where a peak width is remarkably widened in the leading peak PL and the tailing peak PT. Therefore, by evaluating the peak using the first peak width w1, it is possible to determine whether the peak is the leading peak PL or the tailing peak PT. Therefore, adjusting each part of the mass spectrometer 20 based on the first peak width w1, makes it hard for the leading peak PL and the tailing peak PT appear in the mass spectrum based on the measurement data.

In the leading peak PL and the tailing peak PT, the peak width is significantly widened at an intensity of the peak in a range smaller than approximately 50% of the peak intensity. Further, in the leading peak PL and the tailing peak PT, the peak width is more remarkably widened at an intensity of 40% or less of the peak intensity, and the peak width is further remarkably widened at an intensity of 35% or less of the peak intensity. Therefore, from the viewpoint of accurately determining whether a peak is the leading peak PL or not, and whether a peak is the tailing peak PT or not, it is preferable that the peak width calculation unit 521 to set the intensity smaller than 50% of the peak intensity as the first intensity, it is more preferable to set the intensity of 40% or less of the peak intensity as the first intensity, and it is further more preferable to set the intensity of 35% or less of the peak intensity as the first intensity.

If the first intensity is too close to the baseline, it is not preferable because the peak width value is strongly influenced by noise and background. Therefore, it is preferable that the peak width calculation unit 521, as the first intensity, to set an intensity of 10% or more of the peak intensity as the first intensity, it is more preferable to set the intensity of 15% or more as the first intensity, and it is further more preferable to set the intensity of 20% or more as the first intensity.

As in the example of FIG. 3(B), the peak calculation unit 521 preferably calculates the second peak width w2 corresponding to the intensity of 50% of the peak intensity as the second intensity, however it is not particularly limited. The peak width at an intensity of 50% of the peak intensity is preferable because it is used for calculating statistical values such as resolution and is convenient for comparison with various statistical values.

The adjustment unit 522 adjusts the mass spectrometer 20 based on the first peak width w1 and the second peak width w2. The adjustment unit 522 calculates a value obtained by dividing the first peak width w1 by the second peak width w2 (hereinafter, referred to as a peak width ratio R).

It is to be noted that, it also be available that the peak width calculation unit 521 calculates peak widths corresponding to intensities at three or more points and the adjustment unit 522 performs an adjustment based on these peak widths.

The adjustment unit 522 determines whether or not there is a problem in the waveform of the mass spectrum of the standard sample based on whether or not the peak width ratio R is equal to or less than a predetermined threshold value (hereinafter, referred to as peak width threshold value Th). Hereinafter, this determination is referred to as a peak judgement.

The peak width threshold value Th described above is preferably set based on the peak width ratio when the peak is assumed to have a normal distribution shape (hereinafter this peak width ratio is referred to as the reference peak width ratio Ro). The reference peak width ratio Ro is calculated as follows.

The normal distribution G is expressed by the following expression (1), where X is the mean and $\sigma^2$ is the variance, and x is the random variable.

[Math. 1]

$$G_{X,\sigma}(x) = \frac{1}{\sigma\sqrt{2\pi}} \exp\left(-\frac{(x-X)^2}{2\sigma^2}\right) \quad (1)$$

Here, x is replaced with m/z and G is replaced with the detection intensity, and the first peak width of the peak having the normal distribution shape is $\Delta x_{30}$ and the second peak width of the peak having the normal distribution shape is $\Delta x_{50}$. In this case, x corresponding to the intensities of 3/10 and 5/10 of the intensity at x=X corresponds to $\Delta x_{30}/2$ and $\Delta x_{50}/2$, respectively. Therefore, the following expressions (2) holds.

[Math. 2]

$$G_{X,\sigma}\left(X + \frac{\Delta x_{30}}{2}\right) = \frac{3}{10} G_{X,\sigma}(X) \quad (2)$$
$$G_{X,\sigma}\left(X + \frac{\Delta x_{50}}{2}\right) = \frac{5}{10} G_{X,\sigma}(X)$$

By substituting the expression (1) into the expression (2) and performing calculation, the following expressions (3) is obtained.

[Math. 3]

$$\Delta x_{30} = 2\sigma \sqrt{2\ln\frac{10}{3}} \quad (3)$$

$$\Delta x_{50} = 2\sigma \sqrt{2\ln 2}$$

Therefore, the reference peak width ratio $Ro=\Delta x_{30}/\Delta x_{50}=1.32$.

Even if the peak width ratio R is larger than the reference peak ratio Ro, the shape of the peak having the peak width ratio R close to the reference peak width ratio Ro is close to the normal distribution and does not significantly impair the measurement accuracy. Such a peak shape can be treated as not corresponding to the leading peak PL or the tailing peak PT. Therefore, it is preferable that the peak width threshold value Th is set to a value different from the reference peak width ratio Ro by a predetermined ratio such as 3% or 5% or more. In the example of FIG. 3(A) and FIG. 3(B), the adjustment unit 522 may set the peak width threshold value Th to 1.4, for example.

In the case where the peak width ratio R is equal to or less than the peak width threshold value Th, it is considered that there is no major problem in the peak waveform. Therefore, in this case, the adjustment unit 522 ends the adjustment of the mass spectrometer 20, or starts an adjustment of a part different from the part adjusted so far in the mass spectrometer 20.

In the case where the peak width ratio R is larger than the peak width threshold value Th, the adjustment unit 522 determines that further adjustment is necessary because the mass spectrum of the standard sample includes the leading peak PL or the tailing peak PT, and continues to adjust the mass spectrometer 20.

It is to be noted that, the adjustment unit 522 may use a value obtained by dividing the second peak width w2 by the first peak width w1 as the peak width ratio R. In this case, the peak width ratio R larger than the peak width threshold value Th is preferable. The conditions for the peak judgement based on the peak width ratio R and the peak width threshold value Th can be appropriately set. Further, the peak judgement may be performed by a parameter or the like based on the first peak width w1 and the second peak width w2 other than the peak width ratio R. That said, the peak width ratio obtained by dividing either one of the first peak width w1 or the second peak width w2 by the other is preferable, because it is a parameter that eliminates or reduces influence of peak fluctuation (variation of unbiased peak PN) corresponding to σ so that σ are cancelled concerning a peak having the same shape as the normal distribution (see equation (3).

The adjustment unit 522 adjusts a voltage of at least one electrode selected from the first acceleration electrode 311, the second acceleration electrode 321, the flight tube 330 and the reflectron electrode 340. The voltages applied to these electrodes all affects the shape of the peaks in the mass spectrum. The adjustment unit 522 controls the voltage application unit 7 of the measurement unit 100 so as to change the voltage applied to the electrode (arrow A7 in FIG. 2), and the voltage application unit 7 applies the changed voltage to the electrode.

Figure 4:
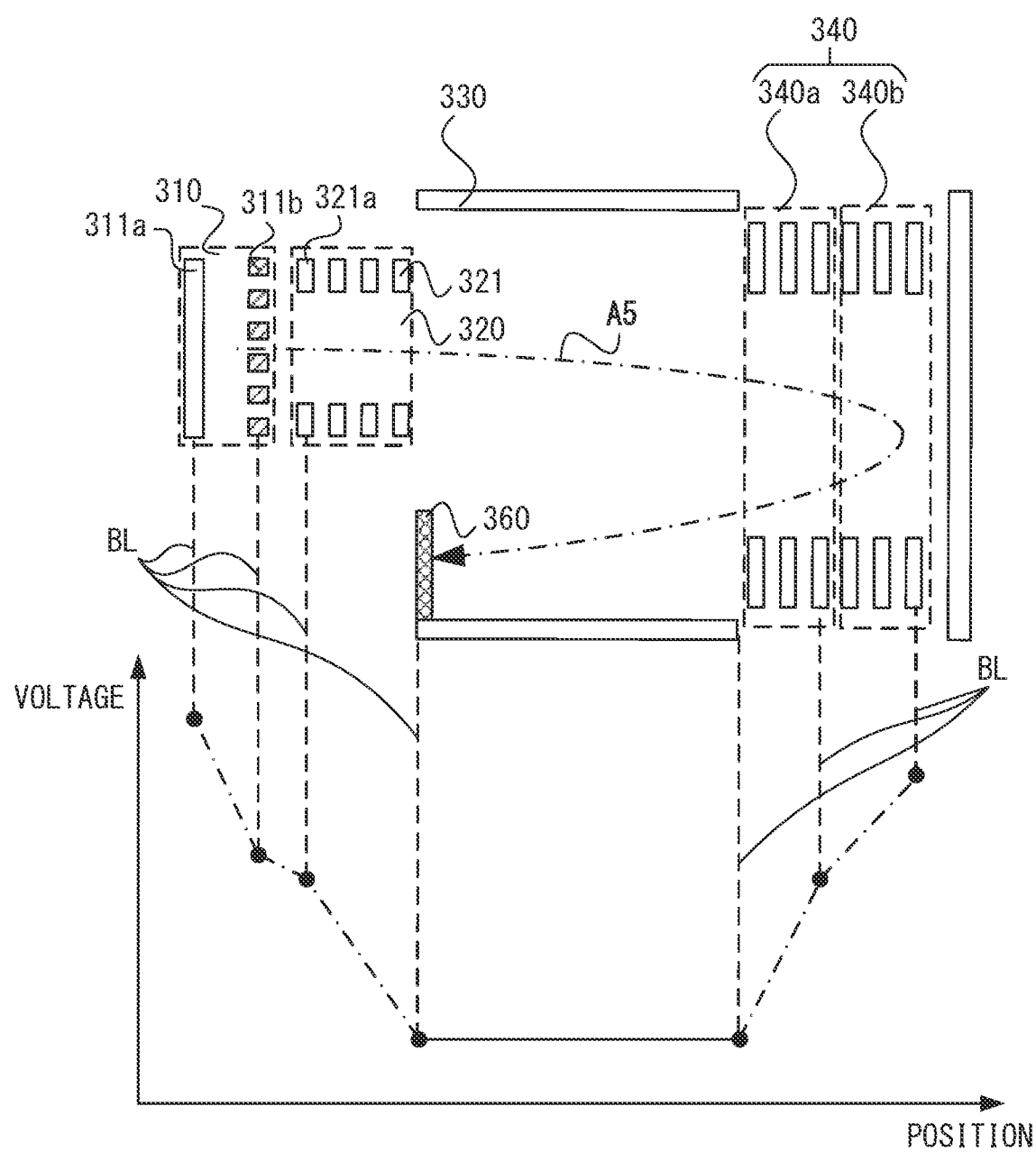
FIG. 4 is a graph schematically showing a voltage applied to each part of the mass spectrometer.

FIG. 4 is a conceptual diagram showing a voltage applied to each part of the mass spectrometer 20 in the case of detecting positive ions. In the lower graph of FIG. 4, the pulse voltages applied to the pusher electrode 311a and the puller electrode 311b, the voltage applied to the electrode 321a that is on the side closest to the first acceleration unit among the second acceleration electrodes 321, the voltage applied to the flight tube 330, the voltage applied to a first reflectron electrode 340a arranged on the acceleration electrode side and the voltage applied to a second reflectron electrode 340b arranged on the back plate side are schematically shown. The broken line BL shows correspondence between each part and the voltage value.

The potential of the space in which the ions In fly while the pulse voltage is applied becomes lower toward the flight tube 330 from the pusher electrode 311a, and becomes higher at the reflectron electrode 340 than the voltage of the flight tube 330. In the case of detecting negative ions, voltages obtained by reversing the polarity of the voltages shown in FIG. 4 are applied.

From the viewpoint of efficient adjustment, the adjustment unit 522 preferably adjusts the voltage of particularly the reflectron electrode 340. This is because the voltage of the reflectron electrode 340 has a particularly large effect on the shape of the peak in the mass spectrum.

From the viewpoint of efficient adjustment, the adjustment unit 522 preferably adjusts the voltage of the second acceleration electrode 321. This is because the acceleration of the ions In by the voltage of the second acceleration electrode 321 has the effect of converging the ions In, and thus can particularly have an effect on the peak width. Among the second acceleration electrodes 321, the voltage from the power supply is applied to the electrode 321a that is on the side closest to the first acceleration unit, and divided voltages of the voltage of the electrode 321a and the voltage applied to the flight tube 330 are applied to other electrodes of the second acceleration electrode 321. It is preferable that the adjustment unit 522 adjusts the voltages of the second acceleration electrodes 321 by adjusting, among the second acceleration electrode 321, the voltage of the electrode on the side closest to the first acceleration electrode.

The adjustment unit 522 can also adjust the voltage (hereinafter, referred to as non-pulse voltage) when the pulse voltage is not applied to the pusher electrode 311a and the puller electrode 311b. This also makes it possible to efficiently adjust the peak waveform.

Figure 5:
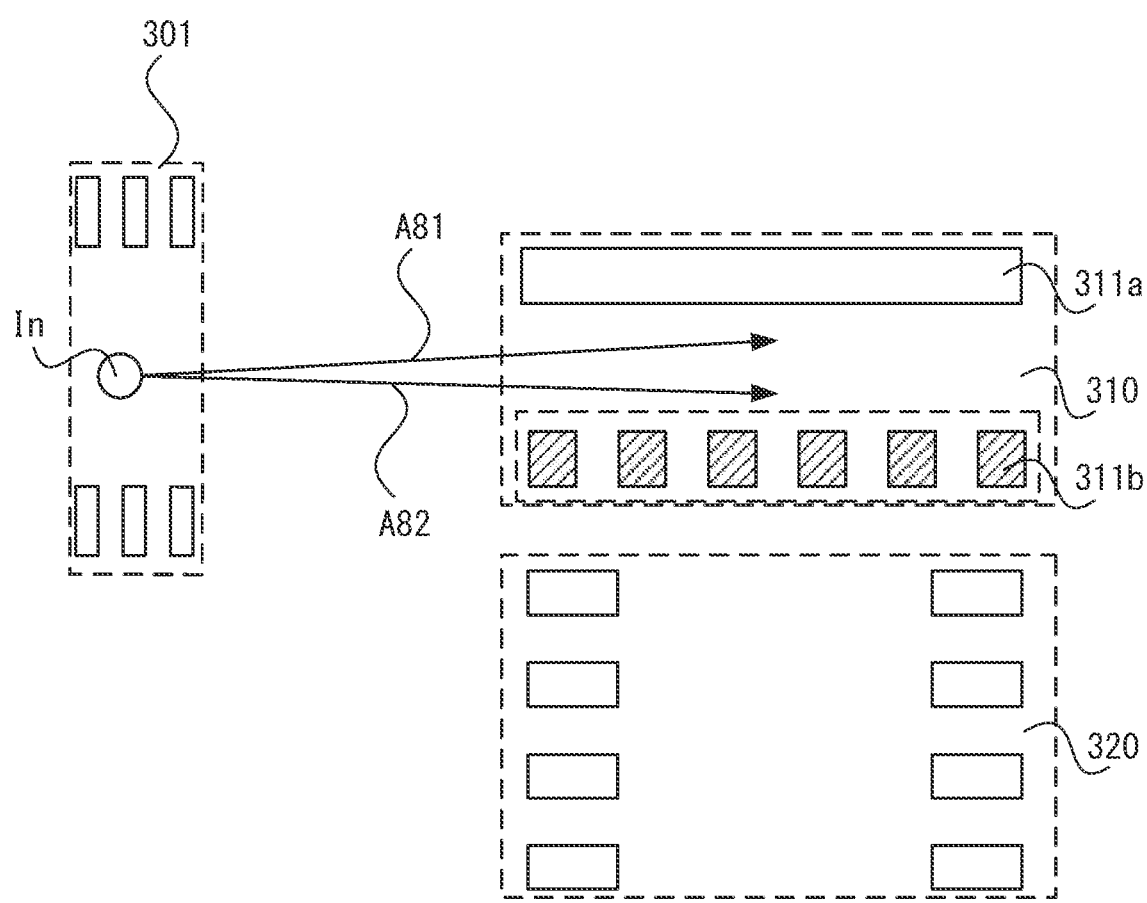
FIG. 5 is a conceptual diagram for explaining acceleration of ions.

FIG. 5 is a conceptual diagram showing movement of ions In in the first acceleration unit 310. By changing the non-pulse voltage of the pusher electrode 311a or the puller electrode 311b, an incident direction of the ions In from the ion transport electrode 301 to the first acceleration unit 310 can be adjusted. Comparing the case in which the ions In take the orbit of the arrow A81 and the case in which the ions In take the orbit of the arrow A82, the acceleration start position and the like of the ions In change, and it affects the flight time. Further, if the incident direction of the ions In to the first acceleration unit 310 is not appropriate, the ions In cannot be converged by the reflectron electrode 340 after passing through the second acceleration unit 320, which becomes to be a cause of generation of the leading peak PL and the tailing peak PT.

The output control unit 53 creates an output image including, for example, information concerning measurement conditions of the measurement unit 100, analysis results of the analysis unit 51 such as a mass chromatogram or a mass spectrum, or the like, and outputs the output image to the output unit 44.

Figure 6:
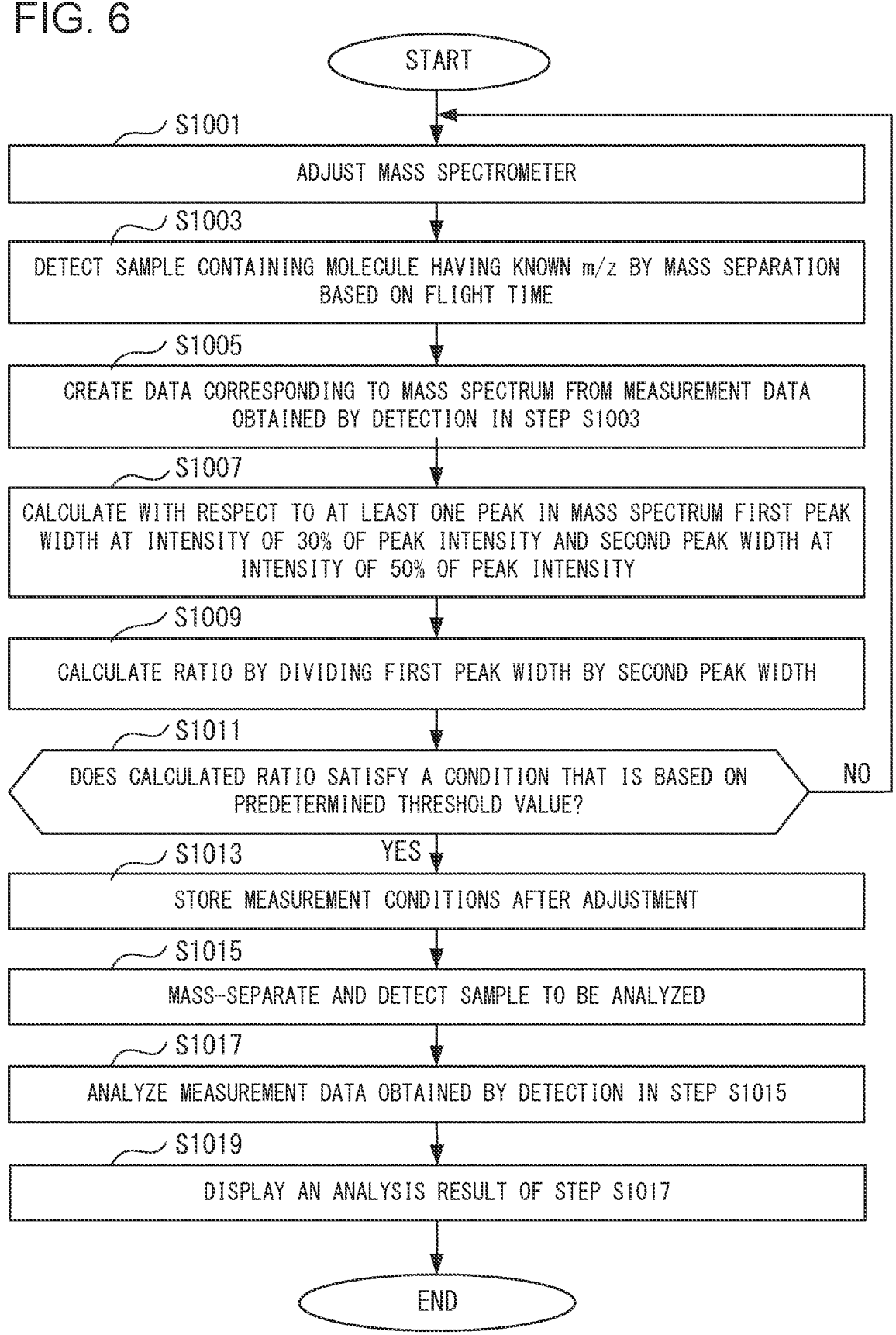
FIG. 6 is a flowchart showing flow of an analysis method according to the embodiment.

FIG. 6 is a flowchart showing flow of the analysis method according to the present embodiment. In step S1001, the adjustment unit 522 adjusts the mass spectrometer 20. For example, in the case where the reflectron electrode 340 is adjusted, the adjustment unit 522 reads out the voltage value that was set in the past and is stored in the storage unit 43 and controls the voltage application unit 7 so as to apply a voltage corresponding to the voltage value to the reflector electrode 340. Upon ending step S1001, step S1003 is started. In step S1003, the mass spectrometer 20 detects a sample (such as standard sample) containing a molecule having known m/z by mass separation based on the flight time. Upon ending step S1003, step S1005 is started.

In step S1005, the analysis unit 51 creates data corresponding to the mass spectrum from the measurement data obtained by detection in step S1003. Upon ending step S1005, step S1007 is started. In step S1007, the peak width calculation unit 521 calculates, with respect to at least one peak in the mass spectrum, the first peak width w1 at an intensity of 30% of the peak intensity and the second peak width w2 at an intensity of 50% of the peak intensity. Upon ending step S1007, step S1009 is started.

In step S1009, the adjustment unit 522 calculates the ratio (peak width ratio R) obtained by dividing the first peak width w1 by the second peak width w2. Upon ending step S1009, step S1011 is started. In step S1011, the adjustment unit 512 judges whether or not the calculated peak width ratio R satisfies a condition that is based on a predetermined threshold value (peak width threshold value Th). In the case where the condition is satisfied, the adjustment unit 522 makes an affirmative judgement on step S1011 and S1013 is started. In the case where the condition is not satisfied, the adjustment unit 522 makes a negative judgement on step S1011 and returns to step S1001.

In step S1013, the storage unit 43 stores the measurement conditions after the adjustment. For example, the storage unit 43 stores the value of the voltage value applied to each electrode of the mass spectrometer 20 already adjusted by the adjustment unit 522. In step S1015, the mass spectrometer 20 mass-separates and detects the sample S to be analyzed. Upon ending step S1015, step S1017 is started.

In step S1017, the analysis unit 51 analyzes the measurement data obtained by detection in step S1015. Upon ending step S1017, step S1019 is started. In step S1019, the output unit 44 displays the result of the analysis in step S1017. Upon ending step S1019, the processing is terminated.

According to the above-described embodiment, the following effects can be obtained.

(1) The analytical device 1 according to the present embodiment comprises: the mass spectrometry unit (the mass spectrometer 20) that separates ions In based on flight time and detects the ions In having been separated; the analysis unit 51 that creates data corresponding to a mass spectrum in which an intensity of the ions In having been detected and m/z corresponding to the flight time are associated; the peak width calculation unit 521 that calculates, the first peak width w1 at a first intensity and the second peak width w2 at a second intensity different from the first intensity for at least one peak in the mass spectrum; and the adjustment unit 522 that performs an adjustment of the mass spectrometer 20 based on the first peak width w1 and the second peak width w2. Accordingly, each part of the mass spectrometer 20 can be adjusted so that waveform distortion such as leading and tailing does not occur, and mass spectrometry can be performed more precisely.

(2) In the analytical device 1 according to the present embodiment, the adjustment unit 522 adjusts at least one voltage selected from voltages of the first acceleration electrode 310, the flight tube 330, the second acceleration electrode 320 and the reflectron electrode 340. Accordingly, the voltage that affects the peak waveform can be changed and the adjustment can be performed efficiently.

(3) The analytical device 1 according to the present embodiment further comprises the storage unit 43 that stores a voltage of the electrode at the time that the adjustment is completed. Accordingly, the adjustment can be performed quickly based on a past adjustment result.

(4) The analysis method according to the present embodiment comprises: separating ions In based on flight time and detecting the ions In having been separated with an analytical device 1; creating data corresponding to a mass spectrum in which an intensity of the ions In having been detected and m/z corresponding to the flight time are associated; calculating the first peak width w1 at a first intensity and the second peak width w2 at a second intensity different from the first intensity for at least one peak in the mass spectrum; and performing an adjustment of the analytical device 1 based on the first peak width w1 and the second peak width w2. Accordingly, each part of the analytical device 1 can be adjusted so that distortion of the peak waveform such as leading and tailing does not occur, and mass spectrometry can be performed more precisely.

The following Variations are also within the scope of the present invention and can be combined with the above embodiments. In the following Variations, the parts showing the same structure and function as those in the above-described embodiment will be referred to by the same reference signs, and the description thereof will be omitted as appropriate.

Variation 1

The analytical device 1 according to the above-described embodiment is a liquid chromatograph-tandem mass spectrometer. However, the mass spectrometer is not particularly limited as long as it is a mass spectrometer that perform the adjustment using the first peak width w1 and the second peak width w2. The analytical device 1 does not necessarily have to include a liquid chromatograph, and may include a separation analytical device other than a liquid chromatograph. The method of dissociation in the mass spectrometer 20 is not particularly limited to CID. The mass spectrometer 20 may be a TOF-MS that is not a tandem mass spectrometer. Moreover, the mass spectrometer 20 may be a TOF-MS other than the orthogonal acceleration type as shown in FIG. 1. Further, the mass spectrometer 20 may be a linear type or a multi-turn type TOF-MS instead of the reflectron type as shown in FIG. 1.

It is to be noted that, in a Fourier transform mass spectrometer or an electric field type Fourier transform mass spectrometer, the first peak width w1 and the second peak width w2 are calculated with respect to a peak of a mass spectrum obtained by performing Fourier transform of the detection signal, and adjustments can be made based on these peak widths.

Variation 2

In the above-described embodiment, performing the adjustment for the peak width ratio R to be equal to or less than the peak width threshold value Th may be combined with performing an adjustment for sensitivity to be maximized.

Figure 7:
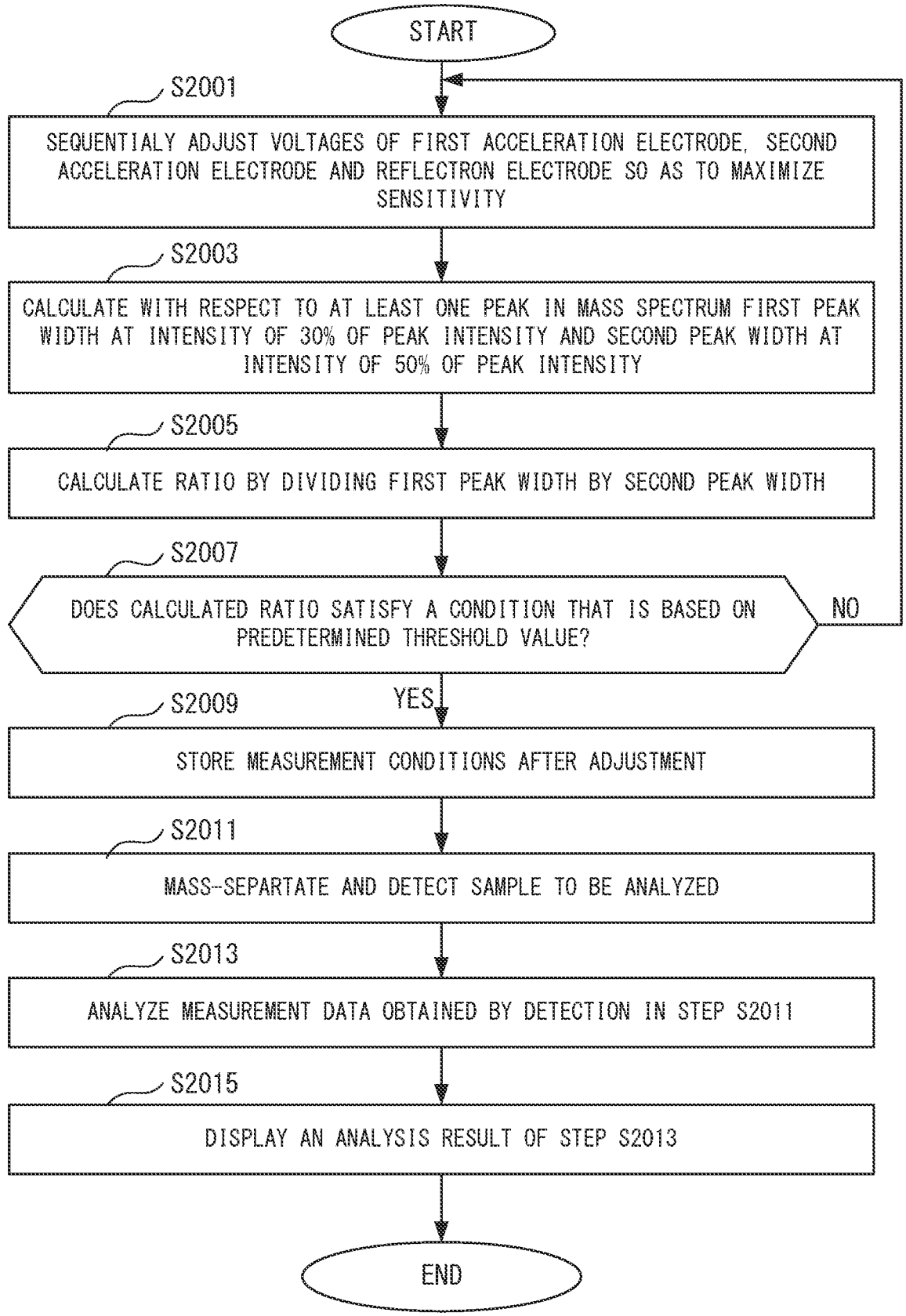
FIG. 7 is a flowchart showing flow of an analysis method according to a Variation.

FIG. 7 is a flowchart showing flow of an analysis method according to the present Variation. In the analysis method according to the present Variation, the analytical device 1 sequentially adjusts the voltages of the plurality of electrodes so as to maximize the sensitivity, then performs the peak judgement, and based on the result of the peak judgement, performing a decision whether or not to adjust the voltages of the plurality of electrodes again.

In step S2001, the adjustment unit 522 sequentially adjusts voltages of the first acceleration electrode 311, the second acceleration electrode 321 and the reflectron electrode 340 so as to maximize the sensitivity, while mass spectrometry of samples containing a molecule having known m/z is performed. Here, the sensitivity is a ratio of an index value (peak intensity, peak area, etc.) indicating a magnitude of a peak of a sample component to the amount of the sample component introduced into the mass spectrometer 20. The adjustment unit 522 adjusts and sets the voltage applied to the first acceleration electrode 311 so that the peak intensity of the peak in the mass spectrum is maximized, while the amount of the sample to be introduced is kept constant. After that, the adjustment unit 522 sequentially sets the voltages for the second acceleration electrode 321 and the reflectron electrode 340 so that the peak intensity of the peak in the mass spectrum becomes the largest. Upon ending step S2001, step S2003 is started.

It is to be noted that, the order of the electrodes to which the voltages are applied is not particularly limited. Further, the voltages of other electrodes such as the flight tube may be adjusted.

In step S2003, the peak width calculation unit 521 calculates, the first peak width w1 at an intensity of 30% of the peak intensity and the second peak width w2 at an intensity of 50% of the peak intensity for at least one peak in the mass spectrum of the sample containing a molecule having known m/z. Upon ending step S2003, step S2005 is started. In step S2005, the adjustment unit 522 calculates the peak width ratio R obtained by dividing the first peak width w1 by the second peak width w2. Upon ending step S2005, step S2007 is started.

In step S2007, the adjustment unit 522 makes a judgement on whether or not the calculated ratio (peak width ratio R) satisfies a condition based on a predetermined threshold value (peak width threshold Th). In the case where the condition is satisfied, the adjustment unit 522 makes an affirmative judgement on step S2007 and S2009 is started. In the case where the condition is not satisfied, the adjustment unit 522 makes a negative judgement on step S2007 and returns to step S2001.

It is to be noted that, since the peak width ratio R can change depending on the order in which the electrode voltages are adjusted in step S2001, the order of the electrodes to be adjusted may be changed when returning from step S2007 to step S2001. Accordingly, the voltage can be adjusted under various conditions and the optimum result can be used, so that the mass spectrometer 20 can be adjusted more precisely. Further, since the second acceleration electrode 321 and the reflectron electrode 340 have strong effect on converging the ions In, the voltages of only these electrodes may be adjusted, and voltages of other electrodes may be fixed without an adjustment. As a result, the mass spectrometer 20 can be adjusted more quickly.

Since steps S2009 to S2015 are the same as steps S1013 to S1019 in the flowchart of FIG. 6, description thereof will be omitted. Upon ending step S2015, the processing is terminated.

In the analytical device according to the present Variation, the adjustment unit 522 sequentially adjusts the voltages of the plurality of electrodes in the mass spectrometer 20 so as to maximize the sensitivity. That is, since the electrodes are adjusted one by one, it is easy to adjust and suitable for automation.

In the analytical device according to the present Variation, the adjustment unit 522, based on the first peak width w1 and the second peak width w2, determines whether or not to continue the adjustment and whether or not to fix voltages of some among of the plurality of electrodes. As a result, each part of the mass spectrometer 20 can be adjusted so that waveform distortion such as leading and tailing does not occur, and an adjustment for this purpose can be performed efficiently.

Variation 3

In the above-described embodiment, the adjustment unit 522 adjusts each part of the mass spectrometer 20 based on the peak widths at two different intensities. However, the adjustment unit 522 may adjust the mass spectrometer 20 based only on the first peak width w1 corresponding to the first intensity. Accordingly, each part of the mass spectrometer 20 can be quickly adjusted.

Even in this case, from the viewpoint of accurately making a judgement on whether or not it is a leading peak PL, or whether or not it is a tailing peak PT, it is preferable that the peak width calculation unit 521 set an intensity smaller than 50% of the peak intensity as the first intensity, it is more preferable to set an intensity of 40% or less of the peak intensity as the first intensity, and it is further more preferable to set an intensity of 35% or less of the peak intensity as the first intensity.

If the first intensity is too close to the baseline, the peak width value is strongly affected by noise and background, which is not preferable. Therefore, also in the present Variation, it is preferable that the peak width calculation unit 521 set an intensity of 10% or more of the peak intensity as the first intensity, it is more preferable to set an intensity of 15% or more of the peak intensity as the first intensity, and it is further more preferable to set an intensity of 20% or more of the peak intensity as the first intensity.

Variation 4

In the above-described embodiment, the peak width calculation unit 521 calculates the first peak width w1 and the second peak width w2 of a peak in a mass spectrum. However, the first peak width w1 and the second peak width w2 of a peak may be calculated for a spectrum in which flight time, not yet converted to m/z, and the intensity are associated with each other. Even in this case, the same effect as that of the above-described embodiment can be obtained.

Variation 5 In the above-described embodiment, the adjustment unit 522 may further adjust a voltage of the collision cell 24. As described below, incident velocity of the ions In into the first acceleration unit 310 can be controlled by adjusting a potential difference between the collision cell 24 and the first acceleration electrode 311. Accordingly, the sensitivity can be further increased and the peak width of the peak in the mass spectrum can be shortened.

Figure 8A:
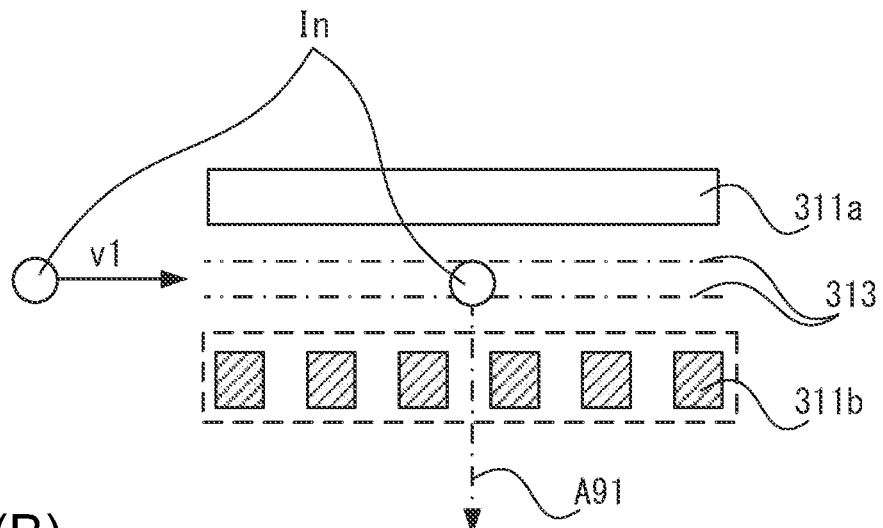
FIG. 8(A) is a conceptual diagram for explaining acceleration of ions in a case where a pusher electrode and a puller electrode are arranged in parallel to each other.

FIG. 8(A) is a conceptual diagram for explaining acceleration of the ions In, in the case where the pusher electrode 311a and the puller electrode 311b are arranged in parallel. In this case, parallel equipotential surfaces 313 are formed between the pusher electrode 311a and the puller electrode 311b depending on the pulse voltage. The ions In having incident into the analysis chamber 30 enter into a space between the pusher electrode 311a and the puller electrode 311b at speed v1 in a direction substantially parallel to the equipotential surfaces 313. When a pulse voltage is applied to the pusher electrode 311a and the puller electrode 311b, the ions In are emitted in a direction substantially perpendicular to the pusher electrode 311a and the puller electrode 311b by an electric field directed in the direction perpendicular to the equipotential surfaces 313 (Arrow A91).

Figure 8B:
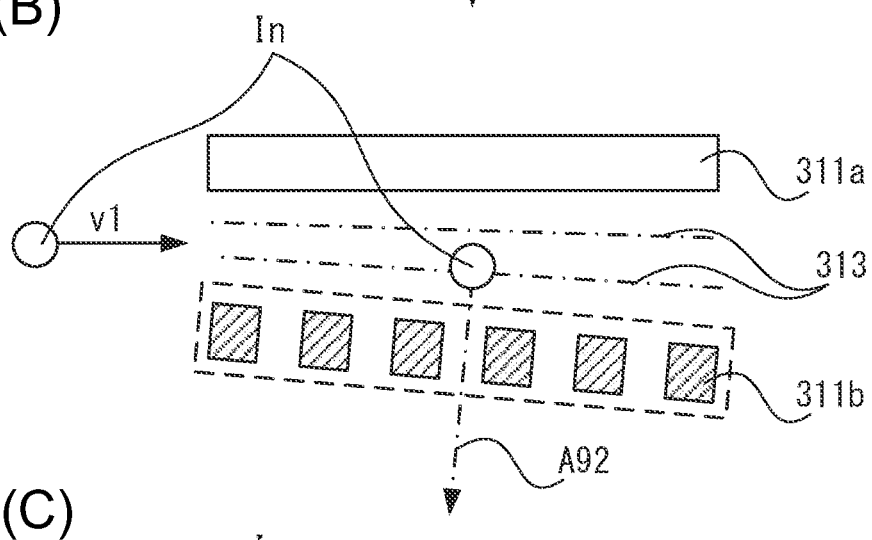
FIG. 8(B) is a conceptual diagram for explaining acceleration of ions in a case where the pusher electrode and the puller electrode are not arranged in parallel.

FIG. 8(B) is a conceptual diagram showing the acceleration of ions In in the case where the pusher electrode 311a and the puller electrode 311b are not arranged in parallel. In this case, the equipotential surfaces 313 formed between the pusher electrode 311a and the puller electrode 311b due to the pulse voltage is tilted as compared with the case of FIG. 8(A). As a result, when the ions In are incident on the first acceleration unit 310 at the same speed v1 as in the case of FIG. 8(A) and a pulse voltage is applied to the pusher electrode 311a and the puller electrode 311b, the ions In are emitted in a direction different from that in the case of FIG. 8(A) (arrow A92) due to an electric field directed in a direction perpendicular to the equipotential surfaces 313.

Figure 8C:
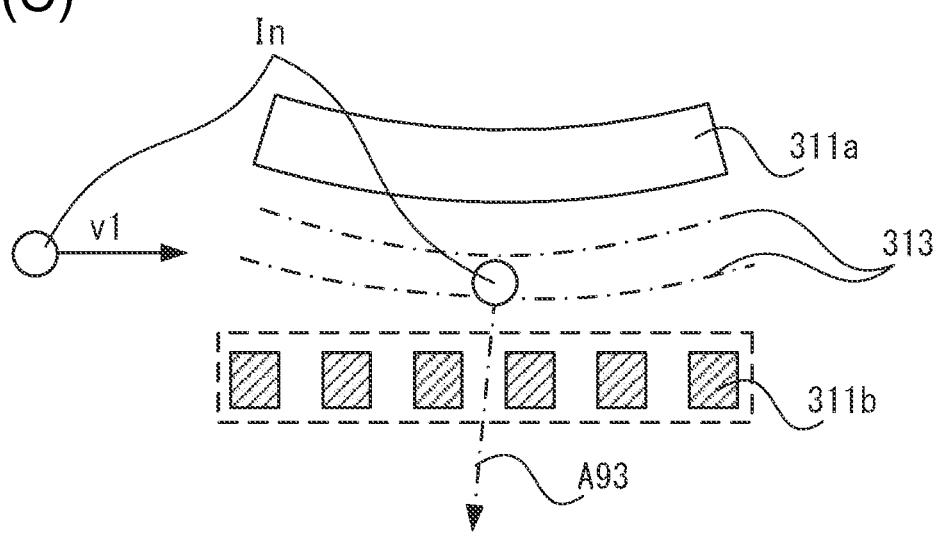
FIG. 8(C) is a conceptual diagram for explaining acceleration of ions in a case where a shape of the pusher electrode is warped.

FIG. 8(C) is a conceptual diagram for explaining the acceleration of ions in the case where the shape of the pusher electrode 311a is being warped. In this case, the equipotential surfaces 313 formed between the pusher electrode 311a and the puller electrode 311b due to the pulse voltage is warped as compared with the case of FIG. 8(A). As a result, when the ions In are incident on the first acceleration unit 310 at the same speed v1 as that in the case of FIG. 8(A) and a pulse voltage is applied to the pusher electrode 311a and the puller electrode 311b, the ions In are emitted in a direction different from that in the case of FIG. 8(A) (arrow A93) due to an electric field directed in a direction perpendicular to the equipotential surfaces 313. The same is applied to a case where the puller electrode 311b is warped.

Figure 9:
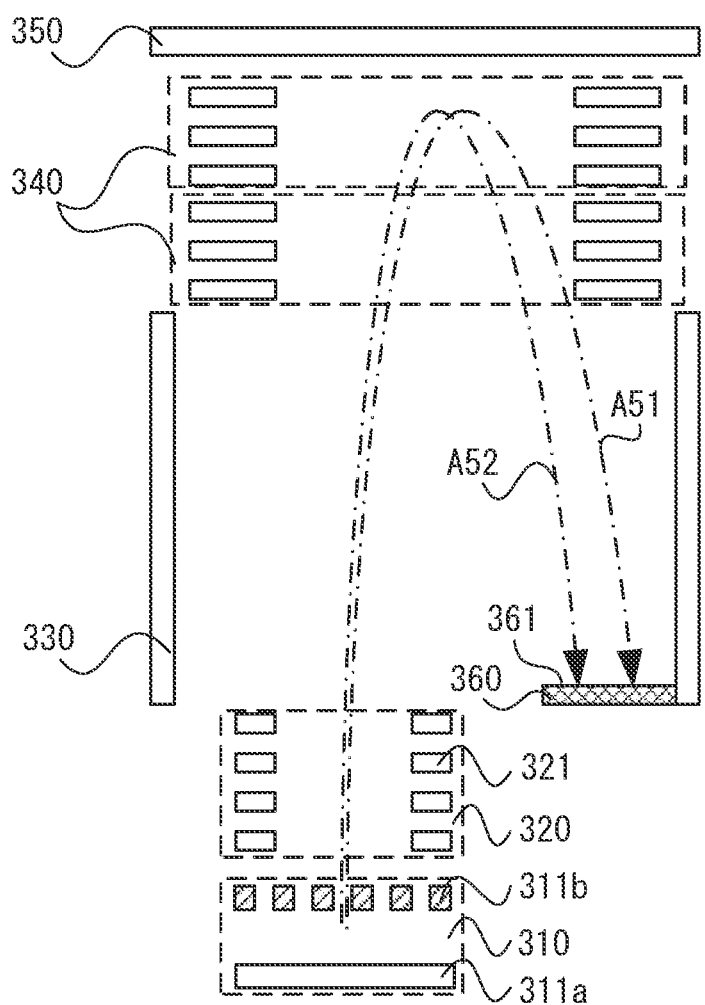
FIG. 9 is a conceptual diagram showing flight paths of ions.

FIG. 9 is a conceptual diagram showing flight paths of the ions In. In FIG. 9, the flight paths of the two ions In emitted from the first acceleration unit 310 in different emission directions are schematically shown by arrows A51 and A52. In the case where the emission directions of the ions emitted from the first acceleration unit 310 are different, the flight paths of these ions In and the incident positions of these ions In on the detection surface 361 of the detection unit 360 change. As a result, the ion In may not fly along the orbit as designed, and a measurement error of the flight time occurs. In particular, if the detection surface 361 is warped, it causes a decrease in mass resolution when the incident position of the ion In on the detection surface 361 changes.

Figure 10:
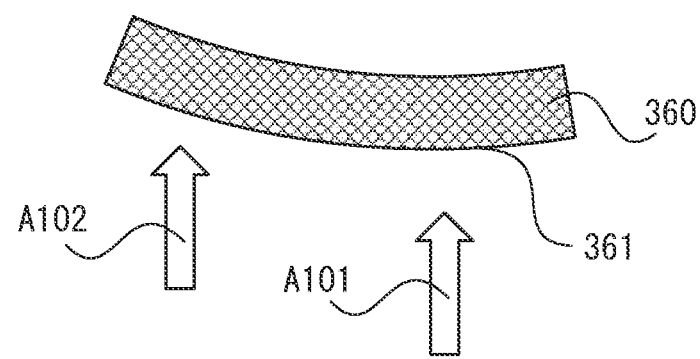
FIG. 10 is a conceptual diagram showing detection of ions in a case where a detection surface of a detection unit is warped.

FIG. 10 is a conceptual diagram showing a detection of ions in the case where the detection surface 361 of the detection unit 360 is warped. Arrows A101 and A102 schematically show the incident positions (and the incident directions) of the two ions In emitted from the first acceleration unit 310 in different emission directions. When the ion In is incident at the incident position indicated by the arrow A101, the ion In is incident substantially perpendicular to the detection surface 361. On the other hand, when the ion In is incident at the incident position indicated by the arrow A102, the ion In is incident from an oblique direction with respect to the detection surface 361. Since the ions In are incident as an ion flux spreading in the direction perpendicular to the traveling direction, the variation in the time when the ions In arrive at the detection surface 361 increases in the case of the arrow A102 as compared with the case of the arrow A101.

Figure 11:
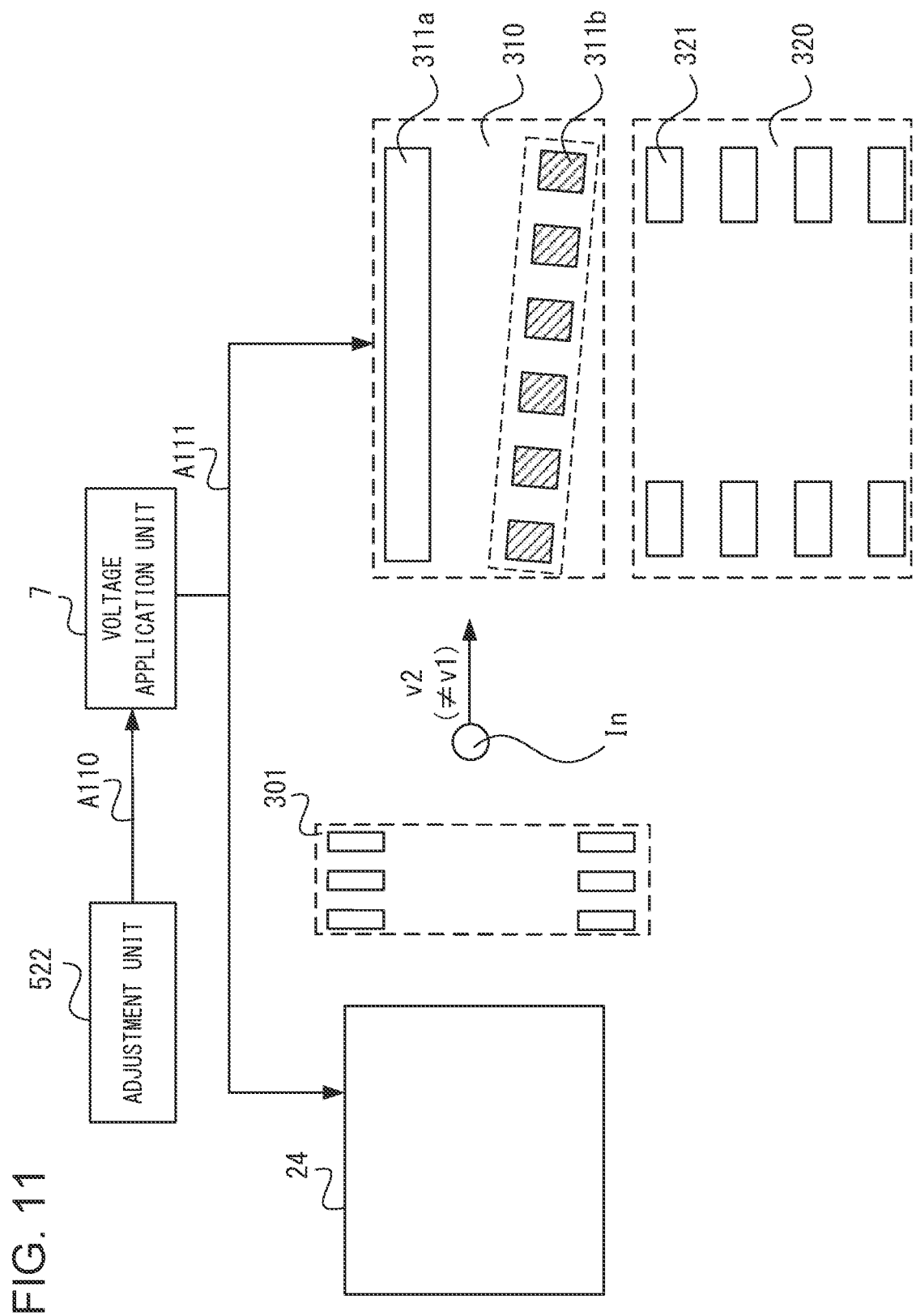
FIG. 11 is a conceptual diagram which shows a control of each voltage applied to a collision cell and a first acceleration electrode.

FIG. 11 is a conceptual diagram which shows a control of voltage applied to the collision cell 24 and the first acceleration electrode 311. The adjustment unit 522 controls the voltage application unit 7 (arrow A110) in order to reduce the variation in flight time as described above, and adjusts at least one of the voltage of the collision cell 24 and the non-pulse voltage of the first acceleration electrode 310. As a result, the potential difference between the collision cell 24 and the first acceleration electrode 310 changes, so that the velocity of the ion In incident on the first acceleration unit 310 changes. In FIG. 11, it is schematically shown that, in the case where the puller electrode 311b is tilted with respect to the pusher electrode 311a, since the potential difference between the collision cell 24 and the first acceleration electrode 311 is changed, the ions incident on the first acceleration unit 310 become to have velocity v2 after the adjustment that is different from the velocity v1 before the adjustment.

It is to be noted that, the adjustment unit 522 may adjust the voltage of either the pusher electrode 311a or the puller electrode 311b or may adjust both voltages.

When the adjustment unit 522 changes the velocity of the ion In incident on the first acceleration unit 310, the emission direction when the ion In is accelerated at the first acceleration unit 310 changes. Accordingly, the flight path of the ion In in the flight tube 330 can be changed, and the incident position of the ion In on the detection surface 361 of the detection unit 360 can be changed. As a result, the ion In can be made to fly in the orbit as designed, and the incident position on the detection surface 361 of the detection unit 360 can be adjusted to prevent a decrease in mass resolution. Further, since the analytical device 1 can be adjusted after assembly, the tolerance of mechanical parts can be relaxed and the cost can be suppressed.

In the analytical device according to the present Variation, the mass spectrometer 20 includes a collision cell 24 that dissociates ions In internally, and the adjustment unit 522 adjusts at least one of, the voltage of the collision cell 24 and the voltage of the first acceleration electrode 311 to which the pulse voltage is not applied. Accordingly, the flight path of the ions In can be adjusted to measure the flight time more precisely.

Variation 6

A program for realizing an information processing function of the analytical device 1 can be recorded on a computer-readable recording medium, and a program related to control of processing of measurement, analysis and display, which includes the above-described calculation by the peak width calculation unit 521 and an adjustment by the adjustment unit 522, and processing related thereto recorded on the recording medium may be loaded into a computer system and may be executed. It is noted that the term "computer system" in this context may refer to an OS (operating system) or a peripheral device in hardware. In addition, the "computer-readable recording medium" may be a portable recording medium such as a flexible disk, a magneto-optical disk, an optical disk or a memory card, or it may be a storage device such as a hard disk built into the computer system. Furthermore, the "computer-readable recording medium" may be a medium that dynamically holds the program over a short period of time, e.g., a communication line through which the program is transmitted via a network such as the Internet or via a communication network such as a telephone network, or a medium that holds the program over a certain length of time, e.g., a volatile memory within a computer system functioning as a server or a client in the above case. Moreover, the program may allow only some of the functions described above to be fulfilled or the functions described above may be fulfilled by using the program in conjunction with a program pre-installed in the computer system.

Figure 12:
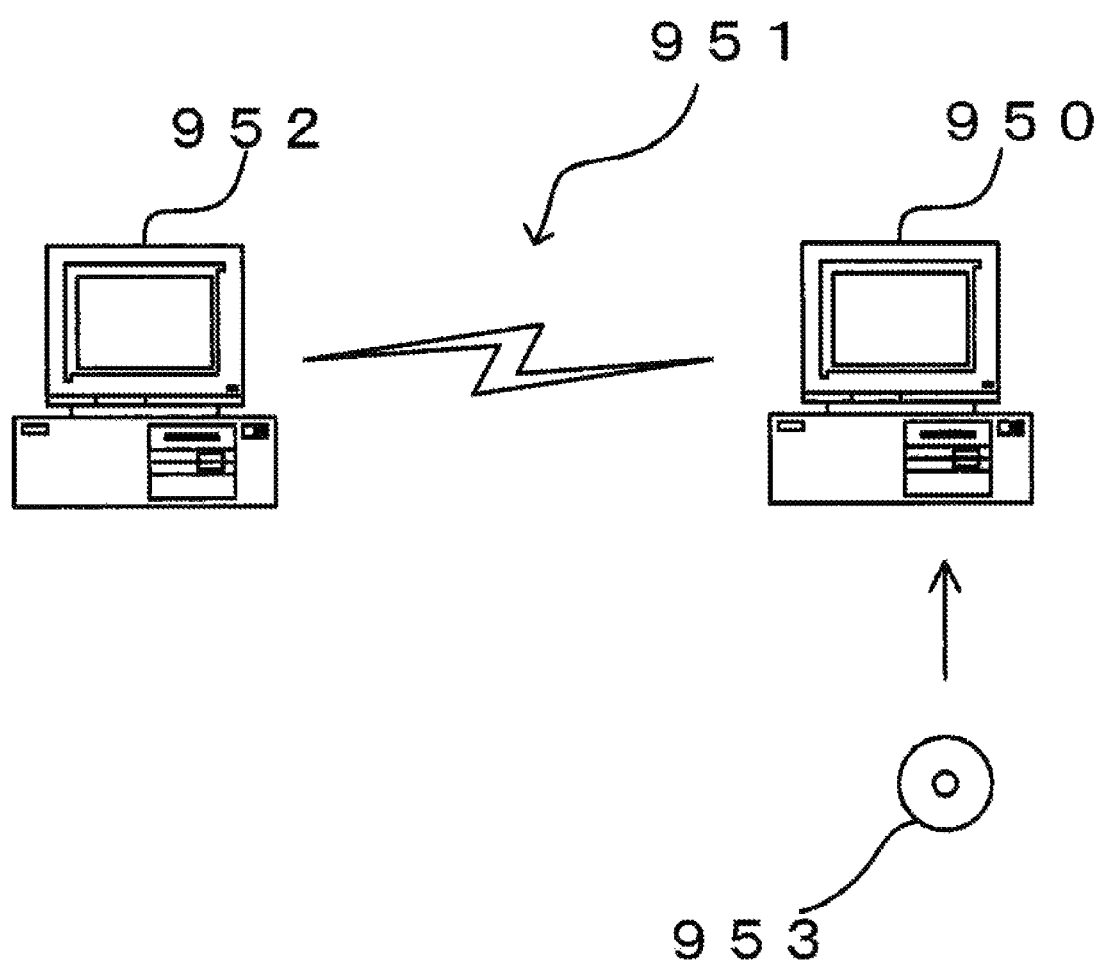
FIG. 12 is a conceptual diagram for explaining a program.

In addition, the present invention may be adopted in conjunction with a personal computer (hereafter referred to as a PC) or the like, and in such a case, the program pertaining to the control described above can be provided in a recording medium such as a CD-ROM or on a data signal transmitted through the Internet or the like. FIG. 12 illustrates how such a program may be provided. A PC 950 receives the program via a CD-ROM 953. The PC 950 is also capable of connecting with a communication network 951. A computer 952 is a server computer that provides the program stored in a recording medium such as a hard disk. The communication network 951 may be a communication network such as the Internet or a personal computer communication network, or it may be a dedicated communication network. The computer 952 reads out the program from the hard disk and transmits it to the PC 950 via the communication network 951. In other words, the program may be delivered as a data signal carried on a carrier wave transmitted via the communication network 951. Namely, the program can be distributed as a computer-readable computer program product assuming any of various modes including a recording medium and a carrier wave.

The programs to realize the above-mentioned information processing function includes a program that causes a processing device to perform: data creation processing to create data corresponding to a spectrum in which an intensity of detected ions In, and flight time or m/z that corresponds to the flight time are associated based on a detection signal obtained by detecting the ions separated based on the flight time (corresponding to step S1005); peak width calculation processing to calculate the first peak width w1 at a first intensity and the second peak width w2 at a second intensity different from the first intensity for at least one peak in the spectrum (corresponding to step S1007); and adjustment processing to adjust the analytical device 1 based on the first peak width w1 and the second peak width w2 (corresponding to steps S1001, S1011). Accordingly, each part of the mass spectrometer 20 can be adjusted so that distortion of the waveform such as leading and tailing does not occur, and mass spectrometry can be performed more precisely.

The present invention is not limited to the contents of the above embodiments. Other aspects conceivable within the scope of the technical idea of the present invention are also included within the scope of the present invention.

REFERENCE SIGNS LIST

1 . . . Analytical Device,
7 . . . Voltage Application Unit,
10 . . . Liquid Chromatograph,
14 . . . Analytical Column,
20 . . . Mass Spectrometer,
21 . . . Ionization Chamber,
23 . . . First Mass Separation Unit,
24 . . . Collision Cell,
30 . . . Analysis Chamber,
40 . . . Information Processing Unit,
43 . . . Storage Unit,
50 . . . Control Unit,
51 . . . Analysis Unit,
52 . . . Device Control Unit,
100 . . . Measurement Unit,
310 . . . First Acceleration Unit,
320 . . . Second Acceleration Unit,
330 . . . Flight Tube,
340 . . . Reflectron Electrode,
360 . . . Detection Unit,
521 . . . Peak Width Calculation Unit,
522 . . . Adjustment Unit,
In . . . Ion,
PL . . . Leading Peak,
PN . . . Unbiased Peak,
PT . . . Tailing Peak,
S . . . Sample,
w1 . . . First peak width,
w2 . . . Second peak width.

The invention claimed is:

1. An analytical device, comprising:
a mass spectrometry unit that separates ions based on flight time and detects the ions having been separated;
an analysis unit that creates data corresponding to a spectrum in which an intensity of the ions having been detected and the flight time or m/z corresponding to the flight time are associated;
a peak width calculation unit that calculates a first peak width at a first intensity and a second peak width at a second intensity different from the first intensity for at least one peak in the spectrum; and
an adjustment unit that performs an adjustment of the mass spectrometry unit based on the first peak width and the second peak width.

2. The analytical device according to claim 1, wherein:
the peak width calculation unit calculates the first peak width with a predetermined intensity smaller than 50% of a peak intensity as the first intensity.

3. The analytical device according to claim 2, wherein:
the peak width calculation unit calculates the first peak width with a predetermined intensity of 15% or more and 40% or less of the peak intensity as the first intensity.

4. The analytical device according to claim 2, wherein:
the peak width calculation unit calculates the second peak width with an intensity corresponding to 50% of the peak intensity as the second intensity.

5. The analytical device according to claim 1, wherein:
the adjustment unit performs the adjustment based on a ratio obtained by dividing either one of the first peak width and the second peak width by the other.

6. The analytical device according to claim 1, wherein:
the mass spectrometry unit includes:
a first acceleration electrode to which a pulse voltage for accelerating the ions is applied;
a flight tube that defines a space in which the ions fly; and
a second acceleration electrode arranged between the first acceleration electrode and the flight tube.

7. The analytical device according to claim 6, wherein:
the adjustment unit adjusts at least one voltage of among selected from the first acceleration electrode, the flight tube, and the second acceleration electrode.

8. The analytical device according to claim 6, wherein:
the mass spectrometry unit comprises a reflectron electrode to which a voltage is applied to change traveling directions of the ions accelerated; and
the adjustment unit adjusts at least one voltage selected from voltages of the first acceleration electrode, the flight tube, the second acceleration electrode and the reflectron electrode.

9. The analytical device according to claim 6, wherein:
the mass spectrometry unit comprises a collision cell that dissociates the ions internally:
the adjustment unit adjusts at least one of, a voltage of the collision cell and a voltage of the first acceleration electrode when the pulse voltage is not applied thereto.

10. The analytical device according to claim 1, wherein:
the adjustment unit sequentially adjusts voltages of a plurality of electrodes in the mass spectrometry unit so that a sensitivity is maximized.

11. The analytical device according to claim 10, wherein:
the adjustment unit, based on the first peak width and the second peak width, determines whether or not to continue the adjustment and whether or not to fix a voltage of any of the plurality of electrodes.

12. The analytical device according to claim 1, further comprising:
a storage unit that stores a voltage of an electrode at the time that the adjustment is completed.

13. An analysis method, comprising:
separating ions based on flight time and detecting the ions having been separated with an analytical device;
creating data corresponding to a spectrum in which an intensity of the ions having been detected and the flight time or m/z corresponding to the flight time are associated;
calculating a first peak width at a first intensity and a second peak width at a second intensity different from the first intensity for at least one peak in the spectrum; and
performing an adjustment of the analytical device based on the first peak width and the second peak width.

14. A non-transitory computer readable medium including a program for causing a processing device to perform:
a data creation processing to create data corresponding to a spectrum in which an intensity of ions having been detected and flight time or m/z corresponding to the flight time are associated based on a detection signal obtained by detecting the ions separated based on the flight time;
a peak width calculation processing to calculate a first peak width at a first intensity and a second peak width at a second intensity different from the first intensity for at least one peak in the spectrum; and
an adjustment processing to adjust an analytical device based on the first peak width and the second peak width.

* * * * *